Jan. 13, 1970     J. N. PETTROW     3,488,847

COMPOSITE ARTIFICIAL CERAMIC TOOTH

Filed March 20, 1967

INVENTOR

JOHN N. PETTROW

BY

ATTORNEY

United States Patent Office 3,488,847
Patented Jan. 13, 1970

3,488,847
COMPOSITE ARTIFICIAL CERAMIC TOOTH
John N. Pettrow, 1741 Verdan Drive,
York, Pa. 17403
Filed Mar. 20, 1967, Ser. No. 624,429
Int. Cl. A61c *13/08*
U.S. Cl. 32—8                                     16 Claims

ABSTRACT OF THE DISCLOSURE

A composite artificial ceramic tooth comprising a high strength ceramic insert on the lingual surface having a preformed precise ceramic anchorage thereon, and a feldspathic enamel-simulating portion integrally bonded by fusion to the insert and having a molded exterior surface characterized to resemble that of a natural tooth, the insert also reinforcing the tooth to resist flexing and compression stresses.

BACKGROUND OF THE INVENTION

The present invention primarily, but not exclusively, is useful in artificial teeth to be used on dental bridges as distinguished from dentures. Bridge teeth usually are adapted for use with either fixed or removable types of partial dentures and frequently employ different types of anchorage means from those on teeth intended to be affixed to the bases of complete dentures. Also, bridge teeth are supported by connection to bridge members which principally are metallic, as distinguished from denture bases formed solely from synthetic resin employed in dentures.

It has been necessary practice for many years to provide various types of anchorage means on ceramic bridge teeth for engagement with complementary means on the backing framework of the bridge, such as ribs, grooves, or recesses and similar forms. It is not uncommon, however, on occasions, for bridge teeth to break during use, usually in the vicinity of the anchorage means. Previous attempts to minimize such breakage have resulted in either large and bulky means of abnormal sizes of base means, or the employment of higher strength porcelain material adjacent the anchorage. Use of the latter material particularly has resulted in undesirable esthetic problems, inability to control shade retention, warpage, and the like.

Typical examples of bridge teeth heretofore and presently used are illustrated in the following patents:

907,949—Ballou, 1908—Cl. 32–9
1,407,557—McVicker, 1922—Cl. 32–9
1,780,979—Moyer, 1930—Cl. 32–9
1,781,908—Vongunten, 1930—Cl. 32–9
1,808,102—Evans, 1931—Cl. 32–9
2,120,827—Zahn, 1938—Cl. 32–9
3,007,246—Neustadter, 1961—Cl. 32–9

SUMMARY OF THE INVENTION

The present invention comprises an artificial ceramic tooth of a composite nature which includes an insert formed from high strength ceramic material and having on the rear or lingual portion thereof integral anchorage means formed directly from said high strength ceramic material and having a shape held within mechanically precise dimension and shape tolerances so as to render the teeth readily interchangeable with other teeth having identical sizes and shapes of anchorages. The insert simultaneously reinforces the entire tooth against transverse flexural and compression stresses. Integrally bonded to said insert, preferably by fusion, in an enamel-simulating portion which is molded to provide a desired contour of outer labial or buccal surface on the tooth that resembles, in appearance, a comparable natural tooth.

The insert is formed from such high strength ceramic materials as alumina, steatite, zircon, corderite, and rutile, and the like. It also is contemplated that such materials may be used either singly or certain combinations of the same may be mixed, as desired. Inserts molded from the same are inherently relatively opaque, in contrast to the desired translucent nature of feldspathic material conventionally used for the production of relatively life-like artificial teeth. However, the feldspathetic enamel-simulating material is formed sufficiently thick in the region of the insert, when the same is united with the insert, that the inherent opacity of such inserts is adequately masked so as to provide highly desirable esthetic appearances in the finished artificial teeth.

The inserts used in such composite teeth are formed by processes comprising part of the invention. Such processes result in said inserts, and especially the anchorage means thereon, having uniformly precise dimensions and also maintaining the original shape during firing, without any appreciable warping. Further, the strength of the inserts is such that when raw dough from which the enamel-simulating portions of the teeth are formed is directly applied to said inserts, molded and fired in the final production of the composite teeth, such inserts will resist any tendency of the raw dough to flex the same while said dough is shrinking incident to being vitrified. Bonding between the insert and enamel-simulating portion may be enhanced by the use of ceramic cements, if desired or necessary. The inserts may be either partially or completely fired or sintered prior to applying the enamel-simulating material thereto.

This invention primarily is concerned with the making of artificial ceramic denture teeth, including those primarily intended to be embodied in bridges. By reference to bridge teeth, it also is intended to embrace both facing-type bridge teeth as well as pontic-type bridge teeth. Essentially, in accordance with the principles of the present invention, such artificial ceramic teeth comprise two primary portions or parts which are integrally united together to form the final tooth product. One of these parts comprises an insert formed primarily from high strength ceramic material and preferably provided on the lingual surface thereof with an appropriate configuration comprising anchorage means formed from the same ceramic material as the insert and having mechanically precise shape and dimensions. The other part is integrally bonded to the front, labial or buccal, surface of the insert and comprises a front or enamel-simulating portion of an artificial tooth which principally is made from feldspathic material capable of providing desired translucency in the finished tooth. The outer, labial or buccal surface of said enamel-simulating portion preferably is precisely molded to provide desired anatomical configurations and other esthetic properties closely resembling those normally present in natural teeth.

Further in accordance with the present invention, the aforementioned inserts are made by any one of a plurality of different processes or methods contemplated within the range of the present invention so as to produce, on a mass production basis, anchorage means formed from the same high strength ceramic material as the insert and possessing accurate and precise shape and dimensions maintained within mechanically close tolerances, thereby rendering the finished teeth interchangeable with other teeth of the same size and shape.

Without restricting the present invention thereto, a number of different exemplary embodiments of anchorage means are illustrated on the attached drawing, as well as a number of different embodiments of procedures and techniques for forming both the insert member per se and the anchorage means connected thereto. Other details and designs of anchorage means, as well as procedures for forming the same, are intended to be embraced within the purview of the present invention, including those primarily intended for denture-type teeth.

Figure 1:
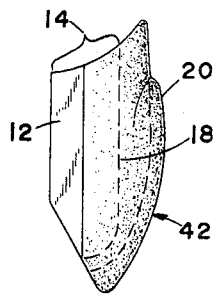
FIG. 1 is a side elevation of an exemplary bridge-type tooth embodying the principles of the present invention.
Figure 2:
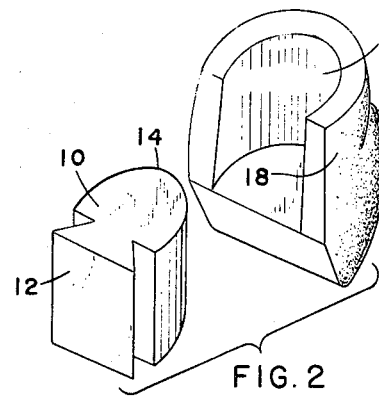
FIG. 2 is an exploded perspective view of the two principal components of the exemplary tooth illustrated in FIG. 1.
Figure 3:
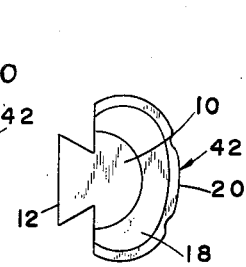
FIG. 3 is a top plan view of the exemplary tooth shown in FIG. 1.

Referring to the drawing, one exemplary embodiment of artificial ceramic tooth is illustrated in FIGS. 1–3, the same comprising a ceramic facing-type tooth. With reference to FIGS. 2 and 3 in particular, it will be seen that the precisely formed insert 10 has an integral anchorage 12 of an exemplary dovetail nature formed thereon. While this type of anchorage is especially useful in bridge-type teeth, it also is suitable, with only minor modifications, for use on a denture-type tooth. The labial surface 14 is complementary to a precisely formed recess 16 provided in the enamel-simulating portion 18 of the tooth, the labial surface 20 of which is precisely molded to provide the same with desired anatomical and esthetic characterizations.

Figure 10:
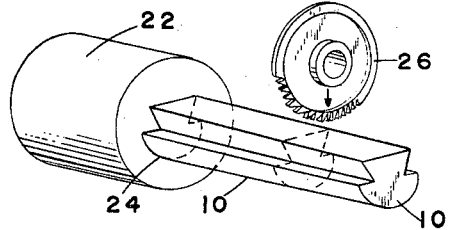
FIG. 10 is a somewhat diagrammatic perspective illustration of an extrusion procedure by which exemplary high strength ceramic inserts and anchorage means may be formed and subsequently cut to desired lengths.
Figure 11:
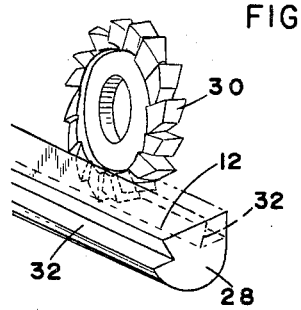
FIG. 11 is a fragmentary perspective and somewhat diagrammatic illustration of a method of precisely forming an exemplary high strength ceramic insert and anchorage means by employing a rotatable cutter or grinder wheel.
Figure 12:
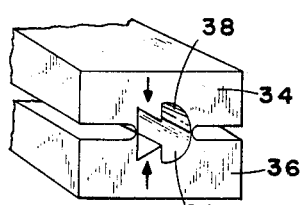
FIG. 12 is an exemplary perspective fragmentary view of a pair of dies having cavities by which one embodiment of elongated bar stock or finished length of high strength ceramic insert and anchorage means may be formed by compression molding.

The insert 10, as indicated above, may be made of any one of a number of different procedures, certain exemplary types of which are illustrated respectively, somewhat diagrammatically, in FIGS. 10–12. Referring to these figures individually, it will be seen that, in FIG. 10, a somewhat diagrammatic extrusion die 22 is provided with a die opening 24 through which an appropriate mixture of material from which the insert 10 is formed is extruded under sufficient pressure to firmly compact said material, adequately, for example, to permit outermost portions of desired, precise lengths to be cut from the longitudinal extrusion by an appropriate rotary saw 26 or other suitable severing means, preferably capable of providing smooth and precise end surfaces upon the severed inserts 10.

Preferably, the severance occurs prior to firing and sintering the inserts. Further, one appropriate technique for forming the inserts comprises extruding a suitable length of the shaped insert material from which a plurality of individual inserts 10 may be severed, such severing into desired lengths occurring after extrusion of adequate lengths of the material has occurred so that the extrusion movement of the material from the die does not have to be compensated for incident to operating the saw 26, for example.

Another procedure suitable for forming the inserts 10 comprises, for example, extruding or otherwise molding appropriate lengths of molded bars 28, such as shown in FIG. 11, which bars may or may not have at least a portion of the desired finished surfaces of the inserts 10 formed thereon, and then complete the formation of the anchorage 12 shown in exemplary manner in FIG. 11 as the same dovetail as illustrated in FIGS. 1–3. The precise formation of such anchorage 12 on the molded bars may be achieved by an appropriate machining operation such as by using a rotatable cutter 30 for purposes of forming the opposed longitudinally extending, angular grooves 32 which define the anchorage means 12. After such molded bars 28 have been formed with the desired anchorage configurations thereon, they subsequently are cut into individual precise lengths, such as by means of the rotatable saw 26 shown in FIG. 10, for example. It is to be understood that the shape of the anchorage is not to be restricted to those illustrated, since other shapes are suitable.

Still another means for forming an elongated insert bar having a desired, precise cross-sectional shape and of indefinite length, for severance into individual inserts 10 of suitable length, is illustrated in FIG. 12. In said figure, it will be seen that a pair of compression mold members 34 and 36 having complementary mold cavities 38 and 40 therein may be utilized to form such elongated bars of insert material precisely in such suitably compressed condition that they may be handled appropriately for ultimate severance into individual inserts 10 respectively required for individual teeth.

It is to be understood that the particular shape of the mold members 34 and 36 is exemplary since other types of mold members may be used in accordance with individual desires of manufacturers. Further, while the mold members shown in FIG. 12 are illustrated as being of the type capable of molding insert stock in indefinite lengths, it is to be understood that appropriate compression molds or the like may be employed to form individual inserts 10, in appropriate mold cavities, substantially in condition to be further processed in the fabrication of the composite teeth illustrated in the drawing and described in detail hereinafter, except possibly for minor trimming to remove flash and the like, after which they are fired.

As will be seen particularly from the exemplary embodiments of composite artificial ceramic teeth illustrated in FIGS. 1–6, the inserts 10 extend longitudinally of the teeth for a major percentage of the total longitudinal dimension of the tooth. Thus, it can be appreciated that the inserts 10 serve a dual purpose, both of which comprise major attributes of the present invention. Without indicating these attributes in the order of their importance, the first comprises providing an integral anchorage 12 and the second is that of providing substantial reinforcement and strength, especially of the type to resist any stresses tending to flex the tooth transversely to the axis thereof.

For purposes of providing the above-recited advantages and attributes of the present invention, the inserts 10 are formed from high strength ceramic material embodying in the formulations thereof very substantial percentages of the essential strength-imparting ingredients selected from the class of high strength ceramic materials comprising, but not restricted entirely to, alumina, steatite, zircon, corderite and rutile, including mixtures or combinations of certain of the same. Typical formulations which embody this class of materials for purposes of forming the inserts 10 are as follows:

EXAMPLE I

| Component: | Percent by wt. |
|---|---|
| Alumina ($Al_2O_3$) | 80 |
| Silica ($SiO_2$) | 16 |
| Boric acid ($H_3BO_3$) | 4 |

The boric acid acts as a flux. The inserts formed from this formulation by one of the foregoing procedures are fired at approximately 2650° for a period of between approximately 1 and 2 hours, depending upon the hereinafter described variations in the formulations.

EXAMPLE II

| Component: | Percent by wt. |
|---|---|
| Alumina ($Al_2O_3$) | 85 |
| Silica ($SiO_2$) | 9 |
| Nepheline syenite ($K_2O \cdot 3Na_2O \cdot 4.4Al_2O_3 \cdot 18SiO_2$) | 6 |

The nepheline syenite functions at least partially as a flux. The inserts formed from this formulation by one of the foregoing procedures are fired at approximately 2700° F. for a period of between approximately 1 and 2 hours, depending upon the hereinafter described variations in the formulations.

In the foregoing examples of typical formulations for preparation of the inserts 10, it is to be understood that it is customary to adjust or modify ceramic formulations of these types by adding kaolin, talc, potash, and similar substances in very limited amounts capable of varying the physical properties desired in the products, such as the coefficient of thermal expansion, tensile strength, and the like. Very minor amounts of mineral pigment also are added for esthetic purposes.

While the most abundant ingredient of the foregoing typical formulations is the high strength ceramic material, such as alumina, which is preferred, the same may be replaced either partially or completely, or combined with, one or more of the other aforementioned high strength ceramic materials such as steatite, zircon, corderite and rutile. In general, alumina, zircon and rutile will require somewhat higher percentages of flux material than when using the other recited high strength materials. Steatite will require the least percentage of flux of any of the enumerated materials, and corderite will require a slightly less percentage of flux than alumina, zircon and rutile.

In general, it is a known principle that ceramic formulations which require higher fusing temperatures, such as are required in general by formulations having alumina therein as the major constituent, will produce maximum strengths, especially in terms of the modulus of rupture, as indicated by the following table.

TABLE 1

Percent alumina, by wt.

| Mod. of Rupture (#/sq. in.): | |
|---|---|
| 21,000–30,000 | 80–90 |
| 31,000+ | 90–97 |
| 41,000 | 97+ |

The firing temperatures used relative to the foregoing examples vary within the range approximately between 2500° and 2950° F., depending upon the flux constituents and systems employed.

One of the outstanding attributes of high strength ceramic materials of the type referred to above comprises the fact that after shaped elements have been formed therefrom and have been completed, prior to firing, by one of the processes described above and illustrated in FIGS. 10–12, for example, or any reasonable variations thereof, and then are fired to maturity or completion at temperatures and for the periods of time indicated above with respect to Examples I and II, the precise shape will be maintained in the completely fired insert even after full shrinkage has occurred as in regard to any shaped ceramic piece which is subjected to firing or sintering. However, shape will be faithfully maintained; only the original dimensions will be lessened by shrinkage. Flat surfaces, straight lines and edges, angularly related faces, and the like, will remain as initially formed even after sintering and shrinkage have been completed. Only the dimensions will change, due to said shrinkage.

The strength imparted to the finished fired inserts 10 by the procedures outlined above when employing the above-recited formulations and techniques and reasonable variations thereof, is highly adequate to maintain such inserts in their original condition and capable of withstanding very substantial forces imposed thereupon which may tend to flex the pieces. In this regard, attention is directed to the enamel-simulating portions 18 of the various embodiments of exemplary composite teeth illustrated in the drawings and described hereinabove. It is conventional practice in the manufacture of artificial ceramic teeth, which are sometimes referred to as porcelain teeth, to form the entire tooth primarily from feldspathic materials. At least the better types and grades of artificial ceramic teeth comprises a so-called body part, which usually is more opaque than the enamel-simulating outer portion which is connected to and is exterior of the body part. The enamel-simulating portion is at least partially translucent, thus attempting to imitate natural teeth as closely as possible, paricularly in regard to the transmission and reflection of light. In such conventional types of artificial ceramic teeth, the partially translucent enamel-simulating portion or layer comprises a minor part of the thickness or transverse dimension of the tooth.

Figure 4:
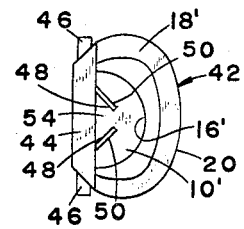
FIGS. 4 and 5 respectively are a top plan view and a side elevation of another embodiment of artificial bridge tooth from that shown in FIGS. 1–3 and being illustrated in association with an exemplary metallic support member or prefabricated backing member comprising part of a metallic bridge backing member.
Figure 5:
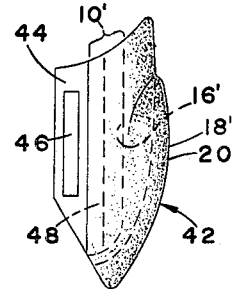
Figure 6:
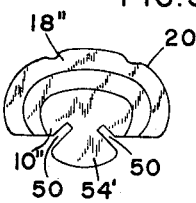
FIG. 6 is a top plan view of a bridge tooth and, more particularly, a tooth facing having anchorage means similar to the embodiment shown in FIG. 4 but of slightly different shape therefrom, the view in FIG. 6 omitting any illustration of any part of a metallic bridge backing member.

Particularly as can be seen from FIGS. 3, 4 and 6 of certin embodiments of the tooth structures comprising the present invention, the enamel-simulating portion 18 actually may comprise, at least in the innermost portions thereof immediately adjacent the insert 10, a certain amount of relatively opaque ceramic material, primarily of a feldspathic nature, as distinguished from the at least semi-translucent outermost layer or portion 42, it is to be understood that the exemplary, dotted line illustration of the enamel portion 42, as illustrated in FIGS. 1 and 5, for example, is to be regarded primarily as illustrative rather than restrictive.

At least the semi-translucent enamel-simulating outer portion 42 of the composite teeth illustrated in FIGS. 1–5, as well as any relatively opaque inner portion connected thereto, preferably are formed substantially from conventional formulations of ceramic dental materials which are predominantly of a feldspathic nature. A typical formulation for such feldspathic dental ceramic material is set forth, as follows, for illustrative purposes:

EXAMPLE III

| Component: | Percent by wt. |
|---|---|
| Potash feldspar ($K_2O \cdot Al_2O_3 \cdot 6SiO_2$) | 70–80 |
| Silica ($SiO_2$) | 1–20 |
| Kaolin | 1–5 |
| Pigment and binder | 1–3 |

As is obvious from the ranges of percentages in the foregoing Example III, reasonable latitude is possible. A selected formulation within this range, for example, is made into a batch having a plastic consistency known as dough. A minor percetnage of water may be utilized to effect the proper consistency thereof if desired. Also, the formulation employed for any relatively opaque, body portion connected to the enamel-simulating portion 18 may be different from the translucent or semi-translucent outer part of enamel-simulating portion 18. Appropriate amount amounts of the aforementioned dough are utilized to prepare what normally will be a composite portion 18, by the following procedure.

The preferred technique for fabricating the various embodiments of composite artificial ceramic teeth illustrated in the drawing is to form the insert 10 in finished condition by being fired to maturity or completion, whereby substantially all shrinkage has occurred and the final shape and dimensions of said insert thereby are established. Maximum strength also has been developed at this stage and the insert is ready to have the enamel-simulating portion 18 applied thereto. This may be done by any one of several different types of procedures, such as, for example, by mounting the insert 10 within a suitable back or rear mold member, such as by placing the anchorage 12 of the insert 10 within an appropriate complementary groove in one of the mold members.

By employing an appropriate veneering or shader mold, for example, the preferred feldspathic dough which is to form a relatively opaque part of the composite enamel-simulating portion 18 is placed within the shader mold cavities and is molded directly therein against the buccal or labial surface 14 of the insert 10. The shader mold then is removed. Usually as a separate operation, a front mold member provided with cavities having the desired characterized contour to be provided on the front or labial exterior of the finished tooth is used, in conjunction with an appropriate shader mold, having mold cavity surfaces complementary to the outer surfaces of the first-mentioned shader mold, to receive and mold a desired amount of the prepared feldspathic dough which is to form the translucent or semi-translucent outer part of the enamel-simulating portion 18 and preferably extends beyond the mesial and distal sides of insert 10.

After removal of the shader molds respectively from the front and rear mold parts referred to above, the relatively opaque and translucent parts of the composite enamel-simulating portion 18 are brought into registry with each other and the combined product, including insert 10, then may be baked to stabilize the shape and permit handling of the composite tooth in its incompleted state. In this state, no appreciable shrinkage of the part 18 has occurred and, in general, only the volatile binder materials have been removed during the aforementioned baking operation. Trimming and other appropriate finishing of part 18 of the tooth readily may take place.

The assembled composite tooth is subjected to appropriate firing and vitrifying to effect complete shrinkage of portion 18 while simultaneously uniting the same integrally to the insert 10. Appropriate temperatures normally used in firing feldspathic type artificial ceramic teeth are employed, these being within the range, for example, of between 2100–2400° F. Such temperature is substantially below that employed to fire the inserts 10, whereby such inserts, which have previously been fired to maturity, are not changed during such final firing, either in regard to shape or dimension. Further, the strength of the insert is such that it resists any tendency to bend or warp in any way, even while the shrinkage of the feldspathic portion 18 is occurring during such final firing of the composite tooth product. Thus, in addition to maintaining the accurate and precise shape of the insert 10, and especially the anchorage 12 thereon during such sintering and fusing of part 18, said insert also imparts highly effective and desirable reinforcement to brace the composite, finished tooth against forces which otherwise would tend to break the tooth from pressures or blows applied transversely thereto.

From the foregoing data in Table 1 connecting modulus of rupture, it will be seen that the values thereof given for the various ranges of alumina content of the inserts 10 is vastly higher than the modulus of rupture inherent to feldspathic type ceramic dental material of the type employed to form the enamel-simulating portion 18, for example. A conventional range of the modulus of rupture for such feldspathic materials is approximately 8,000–12,000 #/sq. in. From this, it will be seen that this vastly superior modulus of rupture possessed by the insert 10 adds most substantially to the entire strength of the composite tooth and thus very extensively augments the inherent modulus of rupture possessed by the feldspathic portion 18 of the composite tooth.

The embodiment of anchorage 12 shown in the specific tooth embodiment illustrated in FIGS. 1–3 primarily is of such nature that it can be utilized in either a permanent or removable type bridge or partial denture. Appropriate complementary recesses are formed, for example, in the metallic base portion of the bridge which is to receive the anchorage 12. Usually, appropriate cement is employed between the complementary surfaces in the bridge and on the anchorage 12 of the tooth. Further, the anchorage 12 preferably is of the type which lends itself readily to being removed from a complementary recess in the base member of a bridge, for example, particularly if the tooth thereon happens accidentally to be broken and replacement is required.

The mechanically precise shape and dimensions provided on the anchorage 12 and maintained throughout the formation of the entire composite tooth readily lends this type of tooth to being replaced, especially in contrast to conventional facing-type teeth employed in bridges and formed essentially from feldspathic type dental ceramic materials, either in conjunction with metallic members incorporated therein or not. The vastly superior strength of the high strength ceramic material from which the anchorage 12 of the present invention is formed greatly minimizes the possibility of the anchorage means or the tooth portion 18 becoming broken due to the inherent strength of the anchorage 12 per se and the structural reinforcement provided in the tooth portion 18 by the inclusion of the anchorage 12 which is of the type extending longitudinally of the tooth for a substantial portion of the longitudinal dimension thereof, as readily can be visualized from FIGS. 1 and 5 especially.

The anchorage structure in the embodiment shown in FIGS. 1–3, projects rearwardly or lingually beyond the principal portion of the insert 10 which is covered, at least on the labial surface, by the enamel-simulating portion 18. However, the use of high strength ceramic material for the insert 10 also very capably renders the insert suitable to have recess-type anchorage means formed therein. Several typical examples of this types are illustrated in top plan view in FIGS. 4 and 6.

Referring to FIG. 4 especially, it will be seen that a section of an exemplary metallic support or backing member 44 is illustrated as being provided with appropriate exemplary attaching ends 46 which may be soldered or otherwise fixedly connected to appropriate dental appliances, such as other bridge backing member sections, for adjacent artificial teeth in a bridge, inlays, crowns, or the like. The labial surface of the backing member 44 also is provided with a pair of metallic strips or blades 48 which, for example, preferably are coextensive in length with the labial face of backing member 44.

The strips 48 may be connected to the backing member in any appropriate manner, such as by soldering, casting, or the like, and it will be seen that outer edges of the strips 48 diverge toward each other and are received within accurately formed complementary grooves 50 formed in the lingual surface of the insert 10' which is fitted into recess 16' formed in the enamel-simulating portion 18', preferably for the full length thereof. The grooves 50 very conveniently may be formed by an accurate milling cutter or rotary saw operated while the insert 10' is held in fixed position within a suitable milling machine or appropriate sawing apparatus. Said grooves preferably are formed within the insert 10' while in preliminary condition, before it is fired or sintered.

Material of the type referred to above from which the insert 10 is formed relative to the embodiment shown in FIGS. 1–3 also is used to form the insert 10' of the embodiment shown in FIGS. 4 and 5. As in regard to the preceding embodiment, material of this type, when suitably formed by compression molding or extrusion under substantial pressure from a suitable die is sufficiently dense and stable in form to lend itself to such machining operations as are described hereinabove. If desired, however, and the material is suitable, the raw inserts may be baked to further stabilize them. When fired or sintered, the inserts are subject to shrinkage, depending upon the exact composition of the material, but this is allowed for in calculating the original dimensions. However, no warpage or other change in shape of the inserts occurs during such firing and said inserts also are dimensionally stable with the exception of the shrinkage referred to. Accordingly, the negative or recessed type anchorage means, such as grooves 50, can be formed in the inserts 10' with mechanical precision and thereby render artificial teeth embodying such inserts readily susceptible to interchangeability.

From FIG. 4 in particular, it will be seen that the diverging grooves 50 result in the formation of a dovetail-shaped rib 54 being formed which, at its narrowest section, is connected to the body of the insert 10'. However, because of the far higher strengths inherent in the material from which the insert 10' is formed, as described in detail hereinabove with respect to the insert and anchorage of the embodiment shown in FIGS. 1-3, the incidence of rupture during use of artificial teeth of the type herein described is far less than that which is possible through the use of conventional feldspathic type dental ceramic materials.

The embodiment of anchorage means illustrated in FIGS. 4 and 5 also is capable of variations in specific configuration, one exemplary additional possible configuration being illustrated in top plan view in FIG. 6. In this embodiment, rather than the dovetail-shaped rib 54' being flush with the lingual surface of the facing-type tooth shown therein, said rib projects lingually a limited distance so as to provide a greater dimension thereof in a lingual-labial direction relative to the insert 10" and thereby afford substantial bracing effect to the insert 10" while permitting the same to have an otherwise thinner body than the embodiment of insert shown in FIG. 4, for example, as readily can be seen by comparing the shapes of the respective inserts 10' and 10". In the embodiment of FIG. 6, the rib 54' is defined by a pair of inwardly diverging grooves 50', which are formed in the insert by means such as described above in regard to the embodiment shown in FIGS. 4 and 5 and for the same purpose. In the embodiment of FIG. 6, the enamel-simulating portion 18" likewise may have a flatter shape, if desired, than the corresponding portion in the embodiment shown in FIGS. 4 and 5.

Figure 7:
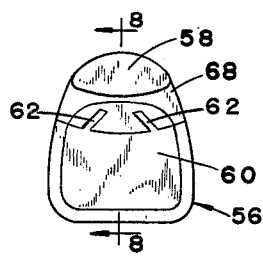
FIG. 7 is a rear elevation of a pontic-type bridge tooth embodying the principles of the present invention.
Figure 8:
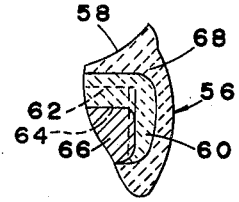
FIG. 8 is a vertical sectional elevation, as seen on the line 8—8 of FIG. 7, of the pontic-type bridge tooth shown in said figure and also illustrating, in sectional manner, an exemplary portion of a basic bridge member to which the pontic tooth is attached.
Figure 9:
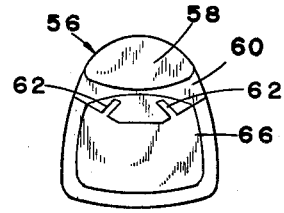
FIG. 9 is a rear elevation of an exemplary pontic-type bridge tooth similar to that illustrated in FIG. 7, but having a somewhat different shape of anchorage means than that employed in FIG. 7.

As indicated above, the present invention not only is applicable to facing-type artificial ceramic teeth for use in bridge and other partial denture type constructions, but, with equal facility, it also is adapted for use in the production of ceramic type pontic artificial teeth, one typical example of which is illustrated in FIGS. 7-9. The principal difference between a pontic-type artificial tooth and a facing-type artificial tooth is that when using a facing-type tooth in a bridge, the normally curved and somewhat concave upper surface of the bridge which engages the gum of the patient partly comprises the ceramic upper end of the artificial facing-type tooth, the remaining ridge lap surface being provided by part of the metal comprising the backing member of the bridge. With regard to a pontic-type tooth, however, bridges employing the same have either very little or no metal actually engaging the gum tissues, but, instead, as can be seen especially from FIG. 8, the pontic-type tooth 56 is provided with an upper ridge lap surface 58 which is appreciably wider in a lingual-labial direction so as to provide, if desired, a ridge lap surface 58 which is substantially entirely formed of ceramic material for engagement with the gum of the patient.

In order to advantageously adapt the principles of the present invention to the pontic-type tooth 56, the insert 60, which is preferably formed from material similar to that from which the inserts 10 and 10' of the preceding embodiments are formulated, is somewhat L-shaped in side elevation, as can be seen from FIG. 8. The upper portion of the insert 60 is provided with a plurality of upwardly and inwardly diverging grooves 62, which may be formed therein by molding, for example, and comprise anchorage grooves capable of receiving complementary metallic strips or blades 64, see FIG. 8, formed on the transversely extending, exemplary metallic bridge section 66 which, for example, may be soldered or otherwise fixedly connected to appropriate adjacent dental apparatus, such as additional bridge backing members or inlays, crowns, or the like. In vertical cross-section, the metallic bridge backing section 66 preferably is formed with a lingual surface blending into the lingual surface portions of the pontic-type tooth 56.

As in regard to the inserts 10 and 10' of the preceding embodiments, the insert 60 preferably is completely shaped as desired and then is preferably fired to maturity so as to effect all shrinkage thereof and thereby develop the maximum strength, such as by producing a far greater modulus of rupture therein than if the insert were formed from feldspathic type dental ceramic material. After such preforming of the insert 60, feldspathic type enamel-simulating material is suitably applied to the label and upper surfaces of the insert 60 in order to form the enamel-simulating portion 68 of the pontic-type tooth 56. Such enamel-simulating portion may be of a composite nature similar to portions 18 and 18' of the preceding embodiments, if desired. It is formed primarily from feldspathic materials having the exemplary formulations thereof also indicated above with respect to the enamel-simulating portions 18 and 18' of the preceding embodiments. Said material preferably is in the form of dental porcelain dough and is sufficiently plastic to permit it readily to be molded with respect to the preformed insert 60 and the tooth is completed by appropriately firing the portion 68 to shrink the same around the preformed insert 60 and firmly unite the same thereto.

Whereas in the descriptions of the various embodiments of composite artificial teeth set forth above the enamel-simulating portions thereof have been described as being molded, while in plastic state, onto preferably completely fired high strength ceramic inserts, it also is contemplated within the purview of the present invention that the enamel-simulating portions may be appropriately molded and either partially or completely fired, as desired, before uniting the same with the completely preformed inserts. Under such circumstances, especially if the enamel-simulating portions are molded and substantially completely fired before attachment to the inserts, the lingual surface thereof shall be closely complementary to the labial surface of the insert. Suitable ceramic cement, such as a borosilicate-type glass, in finely powdered form and mixed in a suitable vehicle to render the same applicable by brushing, for example, may be used to bond the same together by introducing a thin coating thereof between the complementary surfaces of the insert and enamel-simulating member. The assembled members then are subjected to a temperature sufficiently high to fuse the ceramic cement without reaching the fushing point of either the enamel-simulating portion of the tooth or the insert connected thereto and thereby bond the same together. If the enamel-simulating portions have not been fully shrunken when attached to the inserts for final firing, final shrinkage thereof will occur during such final firing. Other variations in procedure are possible.

Further in accordance with the principles of the invention, it has been found that, whereas the inserts made from high strength ceramic material usually are quite opaque, this will not impact any unesthetic characteristics to the finished teeth made in accordance with the invention if the enamel-simulating portions applied to the inserts have a thickness of at least approximately .040" on the labial or buccal portions of the teeth, regardless of whether they are the facing-type teeth or pontic-type teeth. Further in this regard, the outermost parts of the enamel-simulating portions of the teeth are at least semi-translucent so as to resemble the corresponding degree of translucency of natural teeth. The innermost parts of such enamel-simulating portions, as well as ceramic cements, when used, preferably are suitably pigmented to such an extent that the inner surfaces which immediately abut the inserts are capable of satisfactorily masking the insert. Such arrangement, therefore, permits taking advantage of the greatly increased strength characteristics of the inserts while not having the esthetic properties of the teeth harmed or decreased in any way as a result of the inherent opacity of such types of high strength ceramic materials from which the inserts preferably are formed.

While the invention has been illustrated and described in its several preferred embodiments, it should be understood that the invention is not to be limited to the precise details herein illustrated and described, since the same may be carried out in other ways falling within the scope of the invention as described herein.

I claim:

1. A composite artificial ceramic tooth comprising in combination, an anchorage insert formed from high strength ceramic material selected from the class consisting of alumina, steatite, zircon, corderite, rutile and mixtures of two or more thereof and having a fusing temperature substantially higher than feldspar which has been fired substantially to maturity, said insert having preformed precise anchorage means on one surface thereof, and a feldspathic enamel-simulating outer portion integrally fused to the opposite surface of said insert and having a molded exterior surface resembling that of a labial or buccal surface of a natural tooth, said insert providing a substantially stronger ceramic anchorage than is afforded by feldspathic material and said insert also reinforcing said composite tooth to resist bending and compression stresses to a substantially higher degree than feldspathic material.

2. The tooth according to claim 1 in which the fused connection between said insert and enamel-simulating portion comprises ceramic cement disposed between the adjacent surfaces thereof and fused thereto.

3. The tooth according to claim 1 in which said insert has an alumina content of at least 60% by weight.

4. The tooth according to claim 1 in which said insert has an alumina content of between approximately 80% and 97% by weight.

5. The tooth according to claim 1 in which said feldspathic enamel-simulating outer portion is at least partially translucent and has a thickness of not less than .040" in the portion immediately connected to the insert to mask any opacifying effect the insert may have upon said enamel-simulating outer portion.

6. The tooth according to claim 1 in which said feldspathic enamel-simulating outer portion overlies the opposing mesial and distal edges of said insert for the full length thereof.

7. Artificial teeth according to claim 6 in which said feldspathic enamel-simulating outer portions extend beyond the opposing ends of the inserts at the incisal and occlusal extremities of said teeth.

8. The tooth according to claim 6 in which said insert and enamel-simulating outer portion are coextensive with each other at the ridge lap surface of said tooth.

9. The tooth according to claim 1 in which said anchoring means comprises a member extending longitudinally of the tooth and arranged to interengage slidably complementary means connectable to an intra-oral restorative dental appliance.

10. The tooth according to claim 9 in which said anchoring means comprise a plurality of slots extended into said insert from the outer face thereof in diverging relationship to each other.

11. An anchorage insert for a composite artificial ceramic tooth and formed from high strength ceramic material selected from the class consisting of alumina, steatite, zircon, corderite, rutile and mixtures of two or more thereof and having a fusing temperature substantially higher than feldspar and which has been fired substantially to maturity, said insert having preformed precise anchorage means on at least one surface portion thereof and said anchorage means having angularly related surfaces diverging suitably to interlock with a dental restoration device, and an opposite surface portion of said insert being shaped and adapted to be engaged by and integrally connected to a feldspathic enamel-simulating outer tooth portion by fusion for the formation of a composite tooth having a molded exterior surface resembling that of a labial or buccal surface of a natural tooth, said insert providing a substantially stronger anchorage than is afforded by feldspathic material and said insert also being adapted to provide reinforcement for a composite ceramic tooth to resist bending and compression stresses to a substantially higher degree than feldspathic material.

12. The anchorage insert according to claim 11 in which said insert has a high strength ceramic material content of at least 60% by weight.

13. The anchorage insert according to claim 11 in which said insert has a high strength ceramic material content of between approximately 80% and 97% by weight.

14. The anchorage insert according to claim 11 in which said angularly related surfaces of said preformed precise anchorage means are adapted to interengage by sliding movement complementary means connectable to an intra-oral restorative dental appliance.

15. The anchorage insert according to claim 14 in which said insert is elongated and said preformed precise anchorage means thereon extends longitudinally thereof in parallelism with the longitudinal axis of a tooth in which it is to be included.

16. The anchorage insert according to claim 14 in which said preformed precise anchorage means extends inward from the outer lingual surface of said insert in transverse relation to the longitudinal axis of a tooth in which it is to be included.

References Cited

UNITED STATES PATENTS

| | | | |
|---|---|---|---|
| 2,302,375 | 11/1942 | Myerson | 32—8 XR |
| 2,897,595 | 8/1959 | Lee | 32—8 |

ROBERT PESHOCK, Primary Examiner